ABSTRACT OF THE DISCLOSURE

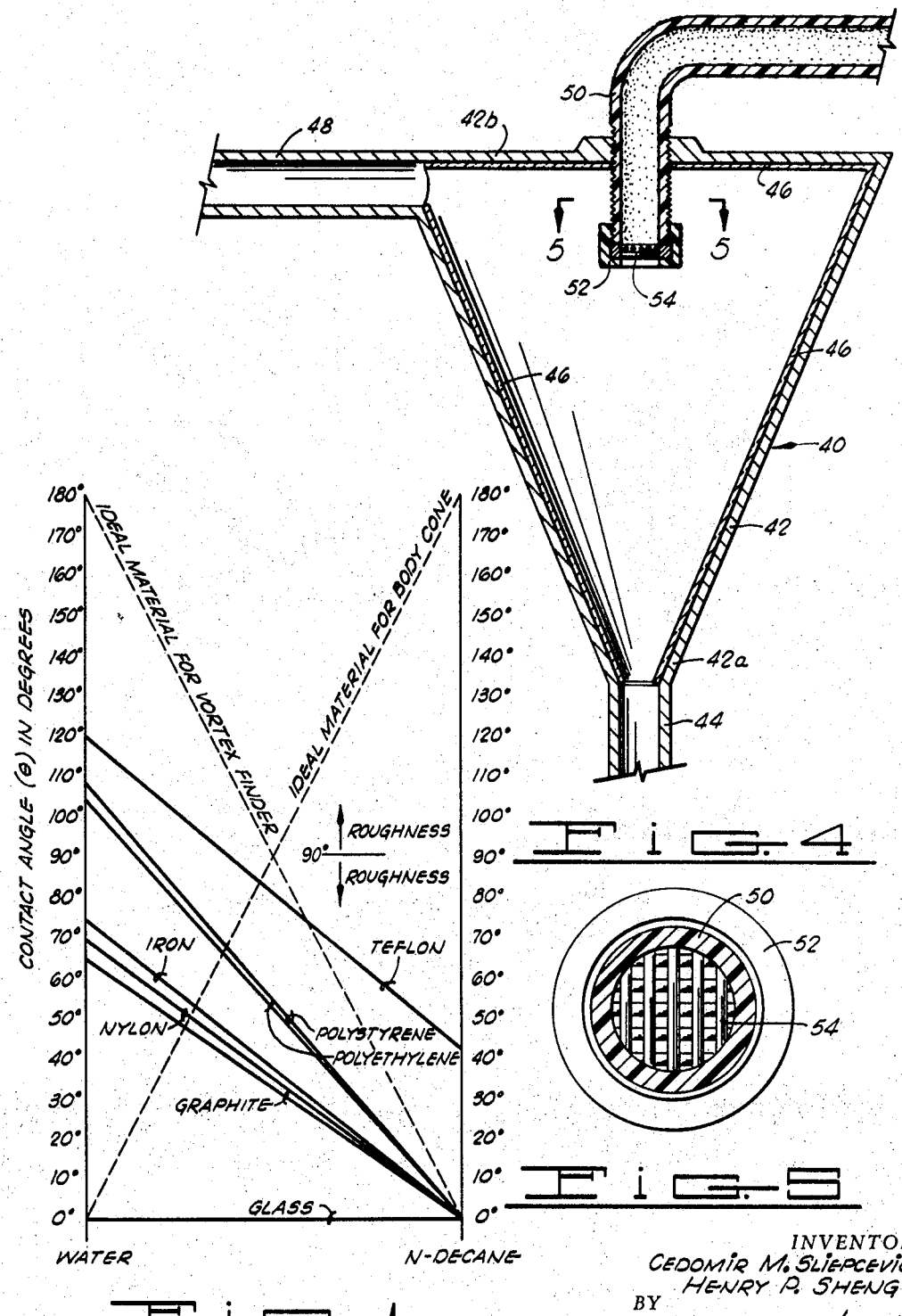

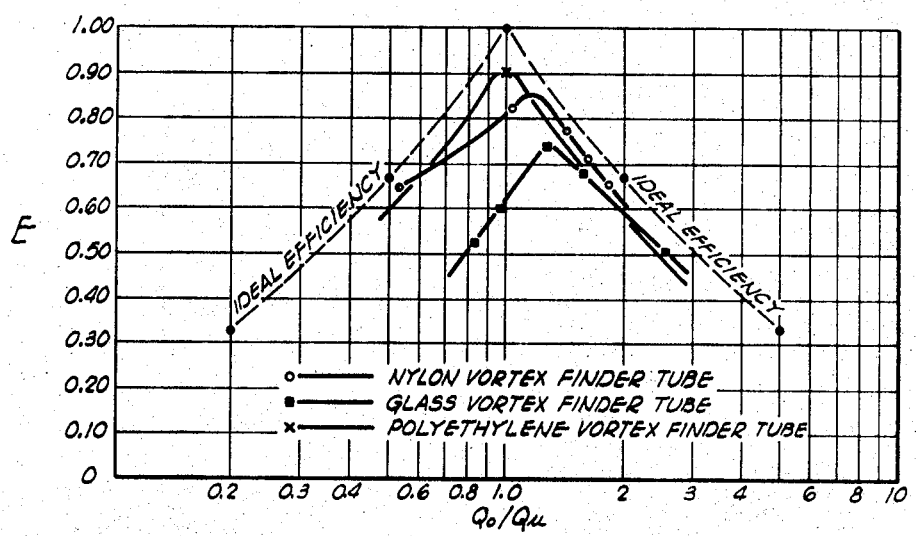
Fig. 3
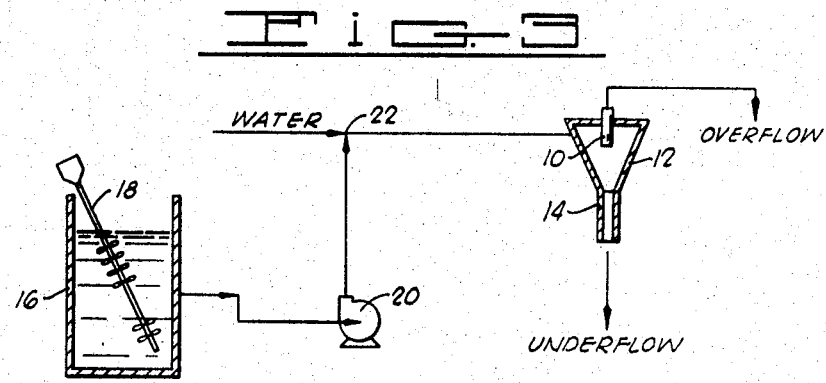
Fig. 2
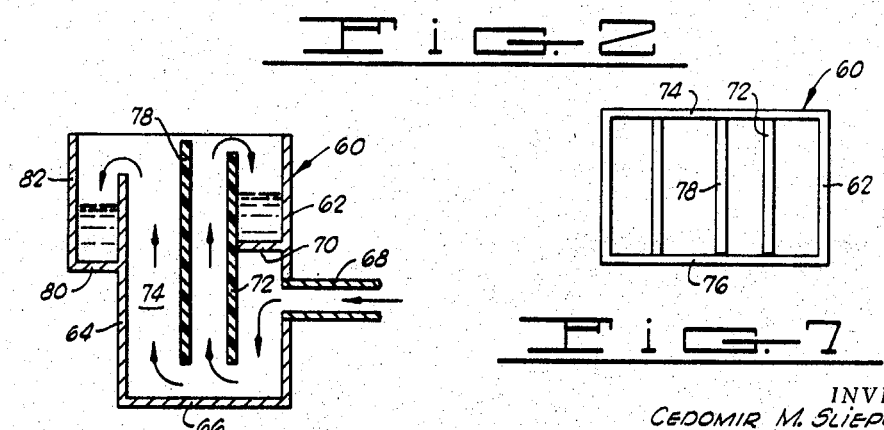
Fig. 6
Fig. 7
INVENTORS
CEDOMIR M. SLIEPCEVICH &
HENRY P. SHENG
BY
ATTORNEYS 3,471,018
METHOD AND APPARATUS FOR SEPARATING A LIQUID MIXTURE
Cedomir M. Sliepcevich and Henry P. Sheng, Norman, Okla., assignors to University Engineers, Inc., Norman, Okla., a corporation of Oklahoma
Filed July 24, 1968, Ser. No. 747,170
Int. Cl. B01d 21/26; B03b 3/44
U.S. Cl. 210—84        16 Claims

A separating system having a plurality of spaced liquid flow channels therein, and having a material of construction near, or constituting one of, the flow channels, which material is wetted substantially better by one liquid phase of a liquid mixture to be resolved into at least two fractions by the system than it is wetted by a second liquid phase of the mixture. The system further has a second material of construction which is near, or constitutes, the other of the flow channels, and this second material is wetted substantially better by the second liquid phase of the mixture than is the first-mentioned material of construction. In one form of the invention, the separating system is a cyclone separator device which includes a hollow conical section having a discharge opening at the apex thereof and a feed pipe entering tangentially into a portion of the conical section which is of relatively large diameter at a point spaced from the apex of the conical section. The device further includes a vortex finder tube extending coaxially into the conical section at the portion thereof which is of largest diameter. The vortex finder tube is either made of, or lined with, a material which is wetted less well by said denser liquid than by the relatively less dense liquid, and the interior surface of the conical section is a material which is wetted less well by the relatively less dense liquid than is the material of which the vortex finder tube is made or lined.

BACKGROUND OF THE INVENTION

Field of the invention

This invention relates to devices for separating mixtures of liquids. In one specific aspect, the present invention relates to a centrifugal separator of the cyclone type which not only utilizes the conventional separatory effects of centrifugal force, but, in addition, takes novel advantage of the familiar concept of preferential wetting to effect separation of the liquids in a mixture.

Brief description of the prior art

It is known that some liquid mixtures which are difficult to separate, such as some types of emulsions, can be effectively separated by centrifugation in rotary centrifuges or in cyclonic separator devices. In the latter type of device, a liquid mixture is introduced to the base or largest diameter portion of an inverted conical member, with the introduction of the liquid mixture being in a tangential direction with respect to the conical geometric configuration of the separator. When the mixture is introduced at relatively high velocity, a spinning action develops in the cyclonic separator with the result that two vortices are developed in the separator, and the denser of the liquids in the mixture, by following the outer vortex, is thrown to the outside, or stated differently, adjacent the wall of the separator. The less dense phases of the mixture remain more centrally located in the separator, with the result that the more dense liquid or liquids in the mixture can be removed from the apex or discharge spout at the lower end of the separator, while the relatively less dense liquids can be removed from the inner or more centrally disposed vortex by means of a vortex finder tube extended along the axis of the conically shaped separator.

Another concept known to the prior art is that some types of materials are better wetted by certain liquids than others. Thus, in general, organic synthetic plastics or resins will be preferentially wetted by a relatively nonpolar organic liquid, as contrasted with a polar inorganic liquid, such as water. On the other hand, glass is wetted about equally well by water and most organic liquids. To our knowledge, differences in wettability of different types of solid structures have been used in a separatory device for the purpose of enhancing the degree of separation of liquids in a mixture in only one prior instance. This utilization of the difference in wettability of a solid with respect to water and oil has been utilized in a belt type conveyor proposed for utilization in the separation of oil and similar floating impurities from a body of water as described in Grabbe et al. U.S. Patent 3,314,545. Here, a moving conveyor belt is extended beneath the surface of the water at one of its ends and above the surface of the water at the other end, and is constructed of a synthetic resin which is preferentially or selectively wetted by the oil as contrasted to the water.

Brief description of the present invention

The present invention is broadly a separatory device which undertakes to achieve the separation of a mixture of a plurality of liquids into several isolated liquid phases by the utilization of the phenomena of preferential wettability. In a preferred embodiment of the invention, separation is achieved by the utilization of wetting characteristics and, in addition, centrifugal force. By the utilization of these combined influences, the degree of separation effected, and the rate of separation can be enhanced significantly over that which is obtainable when either force is used alone. Described in general, though nonlimiting terms, this preferred embodiment of the present invention comprises means for imparting centrifugal force to a mixture of partially or completely immiscible liquids which it is desired to separate by virtue of immiscibility into at least two portions or phases, and a solid member toward and against which the denser of the liquid phases is moved by the applied centrifugal force, this solid member having a surface exposed to contact with the relatively denser liquid phase. There is further included in the apparatus of the invention, a flow path defining means which is spaced from the described surface, and is positioned for receiving and conducting at least one of the relatively less dense liquid phases in the mixture away from the surface after centrifugal force has been initially imparted to the mixture. This flow path defining means includes a second surface which is exposed to contact with at least one of the relatively less dense liquids in the mixture, and which is constructed of a material which is wetted substantially better by the relatively less dense liquid phase than is the solid member previously mentioned.

In one embodiment of the invention, the separatory apparatus is a cyclone separator which includes a generally conically shaped housing which is either constructed of, or lined with, a material which is wetted relatively well (compared to other materials) by the relatively more dense of the liquids in a mixture of liquids to be separated. The flow path defining means, as broadly described in the preceding paragraph, is, in this preferred embodiment of the invention, a vortex finder tube which extends through the base or large diameter end of the conically shaped housing of the cyclone separator, and extends inside the conically shaped housing for a short distance along its axis. The vortex finder tube thus is positioned to pick up and discharge the relatively less dense liquids in the mixture, which are carried spirally upward into or toward the center of the conical housing by the inner vortex as the relatively denser liquids are moved outwardly against the housing under the influence of centrifugal force. The vortex finder tube, or a portion thereof, is constructed of, or lined with, a material which is preferentially wetted by the relatively less dense liquid or liquids in the mixture, and thus enhances, by such selective affinity as is exerted by a preferential wetting of this material by the less dense liquid, the separatory effect of centrifugation.

It is believed that the present invention is the first proposal to apply concurrently the effects of centrifugal force and variation in wetting characteristics to a liquid mixture which is to be separated into a plurality of phases. Accordingly, the inventive character of the concept may also be said to extend to the method utilized in the separation, and it is intended therefore that the method employed in achieving the separation of liquid mixtures in the manner described shall also be considered to be within the scope of the invention.

From the foregoing general description of the invention, it will have become apparent that a major object of the invention is to provide an improved separatory apparatus for separating a liquid mixture into a plurality of phases by applying to the mixture selectively acting forces of attraction due to the presence in the apparatus of at least two spaced surfaces which are, in the case of one of the surfaces, preferentially wetted by the relatively less dense liquid or liquids in the mixture, and in the case of the other surface, wetted better by the relatively more dense liquid or liquids than is the one (first mentioned) surface.

An additional object of the invention is to provide an improved cyclone separator which can more efficiently and more rapidly separate from each other, two or more of the individual liquid phases within a liquid mixture.

Another object of the invention is to provide a method for improving the efficiency of separating from a liquid mixture which includes multiple liquid phases, at least one of the phases thereof, which improvement comprises combining the separatory effect which can be realized from the utilization of selectively wetted surfaces with separation achieved by centrifugation.

A more specific object of the invention is to provide a method for enhancing the separation efficiency of hydrocyclones by proper selection of the materials of construction for the conical shell and the vortex finder tube in the first instance, and by selected variation in the smoothness of the surfaces of construction in the second instance.

In addition to the described objects and advantages of the invention, additional objects will become apparent as the following detailed description of the invention is read in conjunction with the accompanying drawings.

Brief description of the drawings

FIGURE 1 is a diagram illustrating certain aspects of significance derived from the wetting characteristics of certain systems.

FIGURE 2 is a schematic illustration of laboratory apparatus employed for evaluating the effect of altering wettability characteristics of cyclone separator materials of construction.

FIGURE 3 is a graph depicting certain results derived from the use of the apparatus illustrated in FIGURE 2.

FIGURE 4 is a vertical sectional view of a cyclone separator constructed in accordance with the present invention.

FIGURE 5 is a sectional view taken along line 5—5 of FIGURE 4.

FIGURE 6 is a schematic sectional illustration of apparatus used to effect separation of a mixture of water and hydrocarbon utilizing materials differing in wetting characteristics to enhance the separation.

FIGURE 7 is a plan view of the apparatus illustrated in FIGURE 6.

DETAILED DESCRIPTION OF A PREFERRED EMBODIMENT OF THE INVENTION

It is known that different liquids have a tendency to wet or to spread upon a particular solid surface to varying degrees, depending on the surface free energies at the contact areas. The surface free energies are in turn related to the surface tensions of the solid, liquid and ambient vapor. A quantitative measure of the degree of wetting is given by the contact angle between a drop of the liquid and a plain solid surface on which it is resting. If the contact angle, usually designated $\theta$, is zero, the liquid is said to wet the solid completely. If the contact angle is 180°, then the liquid does not wet the surface at all. Between the contact angles of 0° and 180°, the liquid exhibits varying degrees of wettability. By convention, or arbitrary designation, if $\theta$ is less than 90°, the liquid is said to wet the solid; if $\theta$ is greater than 90°, the liquid is said not to wet the solid. As can be found in standard reference works on surface chemistry, such as, for example. "The Chemistry and Physics of Interfaces," published by the American Chemical Society, Washington, D.C., in 1965, page 3, contact angle is defined as $$\gamma_L \cos \theta = \gamma_s - \pi_e - \gamma_{Ls} \qquad (1)$$

where:
$\gamma_L$=surface free energy of the liquid
$\theta$=contact angle
$\gamma_s$=surface free energy of the solid
$\gamma_{Ls}$=surface free energy between the liquid and solid surface in contact
$\pi_e$=equilibrium film pressure of absorbed vapor at the solid surface As explained by Zisman in the paper appearing in Industrial Engineering Chemistry, vol. 55, pp. 19–38, October 1963, Equation 1 can be modified for the case in which $\pi_e$ is essentially zero (such as for hydrocarbon liquids or solids) to give $$\cos \theta = 1 + (2\sqrt{\gamma_s^d})(\sqrt{\gamma_L^d}/\gamma_L) \qquad (2)$$

where $\gamma_s^d$ and $\gamma_L^d$=surface free energy of the solid and of the liquid, respectively, due to London dispersion forces.

Theoretically, Equation 2 permits calculation of the contact angle of the liquid on a smooth solid surface if the values for the surface free energies on the right hand side of the equation are known. The more nearly that $\theta$ approaches zero, the more the liquid tends to wet the solid.

There may be considered next two immiscible liquids, such as n-decane and water, in which the n-decane is less dense than the water. In a conventional separatory device, such as a cyclone separator, which is fabricated completely of the same material, a certain efficiency of separation of the two liquid phases will be achieved. Thus, the overflow through the vortex tube of the cyclone will contain a proportionately higher percentage of hydrocarbon than water, and the underflow will contain proportionately more water than hydrocarbon, than was originally present in the initial mixture fed to the cyclone. The separation efficiency of the water from the n-decane is always less than 100 percent.

It is the purpose of this invention to demonstrate that the degree of wettability of materials by the liquids in a mixture to be separated into a plurality of phases can be put to a practical use in enhancing the efficiency with which such liquids may be separated by such devices as baffles and cyclone separators. Referring to FIGURE 1, this figure illustrates a method for selecting certain materials of which solid surfaces contacted by the mixture to be separated may be beneficially constructed. In referring to FIGURE 1, and considering the information there disclosed, a cyclone separator of conventional geometry will be considered as an example of those devices which may be improved in separatory efficiency by the teachings of the present invention. If, for example, the vortex finder tube of a cyclone separator were made of a material which is wetted preferentially by the lighter liquid (hydrocarbon), and if the conical shell or housing is made of a material which has a zero contact angle (complete wet-uid (water), the lighter liquid will tend to be "attracted" or drawn toward the vortex finder tube and the heavier liquid toward the conical shell. There is thus introduced in the system, an additional driving force which enhances the separation which is normally achieved by the hydrodynamic forces acting in such separatory devices.

In principle, the ideal surface for the construction of the vortex finder tube in a cyclone separator would be a material which has a zero contact angle (complete wettability) with respect to n-decane, and a contact angle of 180° (zero wettability) with respect to water. Conversely, the ideal surface for the body cone or conical shell of the cyclone would be a material which has a zero contact angle with water and a contact angle of 180° with n-decane. In FIGURE 1, these two ideal surfaces are represented schematically by the two dashed lines identified as representative of ideal materials for the vortex tube and for the body cone. In actual practice, such ideal surfaces are not known to us to be presently available, and departures from ideality appear to be inevitable. Nevertheless, by proper selection of materials of construction on the basis of wetting characteristics, departures from the ideal materials portrayed can be reduced, and the separation efficiency of cyclones and other devices significantly enhanced.

As exemplary of the effect of proper evaluation and selection of materials on the basis of their wetting characteristics, several materials have been tested and their wetting characteristics with respect to water and n-decane are portrayed in FIGURE 1. In referring to this figure of the drawings, it should be understood that the lines there shown have no physical significance other than at their extremities where they intersect the water and n-decane scales giving values for contact angles of these liquids on the several surfaces represented by the diagonal lines extended between the scales.

It will be noted that all of the materials except glass are more poorly wetted by water than by n-decane, and thus in the method of presentation utilized, are represented by lines which may be said to have a negative slope. For this reason, none of the portrayed materials approach ideality for the purpose of construction of the body cone of the cyclone. The object must therefore be to select materials for construction of the vortex finder tube, and of the body cone of the cyclone, which demonstrate the greatest differences in wettability with respect to the two liquids in the system being considered by way of example. In other words, that material which is best wetted by water and most poorly wetted by the hydrocarbon (and thus has the "flattest negative slope") may be used to best advantage in the construction of the body cone, all other considerations being equal. Conversely, that material which is best wetted by the n-decane, and most poorly wetted by the water may be most advantageously selected for use in the construction of the vortex finder tube.

As has been stated, wettability increases with the increase in the contact angle θ. Of the materials considered in the FIGURE 1 presentation, glass can thus be most advantageously employed as the material of which the internal surface of the body cone is constructed, since its slope is at least zero, and polystyrene is the best of the considered materials for construction of the vortex finder tube. It will be appreciated, however, that so long as the materials selected for the vortex finder tube, or for a portion thereof contacting the liquid to be separated, and for the body cone or a portion thereof, have different "slopes," the separation efficiencies can be enhanced due to the factor of preferential wettability. Though it is not the object of the present invention to consider in detail another aspect revealed by the data portrayed in FIGURE 1, it might also be observed that considerations of wettability can also be employed for reducing the separatory effect upon liquids in a cyclone separator environment. This possibility would find utility in a situaton, say, where a mixture of immiscible liquids of different density carrying entrained therein solids of yet another density was charged to the cyclone separator primarily for the purpose of removing the solid particles therefrom without achieving segregation of the liquids and with, in fact, the secondary objective of retaining the liquids in intimate admixture without the occurrence of separation between these phases.

The foregoing discussion is based on the wettability characteristics of surfaces without reference to their physical character. Wettability of any surface can be modified, however, by altering its physical character by roughening or smoothing the surface. If the liquid in contact with a smooth solid surface has a contact angle of less than 90°, roughening of this surface tends to decrease the contact angle (that is, change the contact angle to a value closer to zero), thus making the surface more wettable by the liquid. Thus, in referring to FIGURE 1, n-decane on a smooth Teflon surface has a contact angle of about 42°. By roughening the Teflon surface, the contact angle can be decreased. When the contact angle of a liquid on a relatively smooth surface is greater than 90°, the opposite phenomena is observed, and the contact angle is increased by roughening procedure and the material in contact with the liquid is less well wetted thereby. For example, it will be perceived by reference to FIGURE 1 that the contact angle of water on a smooth Teflon surface is about 120°. Theoretically, this contact angle can be increased to about 150° by roughening the Teflon surface. Using the slope terminology hereinbefore adopted in describing the angulation of the lines representative of materials in FIGURE 1, it will thus be apparent that roughening of the surface of Teflon can have the effect of imparting to this material a higher negative slope than the smooth surface polystyrene which, when smooth surfaces alone are considered, appears to be the best material of those depicted in FIGURE 1 from the standpoint of vortex finder tube construction.

In summary, then, the efficiency of separation of a mixture of liquids in a cyclone or other separatory device can be enhanced by either using materials of construction having chemical characteristics which provide the desired variation in wettability for constructing the vortex finder tube and the body cone, or by varying the roughness of the respective solid surfaces used in the vortex finder tube and body cone and exposed to contact with the mixture or a combination of both of these methods of enhancing separation. The use of carefully selected materials of construction having proper wetting characteristics to achieve the objects of the present invention is not to be confused with the use of liners or sleeves in cyclone separators or other separatory devices for the purpose of reducing wear, corrosion or agglomeration of solids in the feed stream, or upon the walls of the cyclone or other separatory device.

To further investigate and confirm the hypothesis of enhancing the separation efficiency of cyclone separators and other separatory devices by the method of using different materials of construction having different wettability characteristics, a series of experiments were performed. Experimental runs were carried out utilizing the laboratory apparatus schematically illustrated in FIGURE 2. In one group of five runs, a glass vortex finder tube 10 was extended into the conical shell 12 of a cyclone separator. For purposes of comparison, the glass vortex finder tube 10 was then replaced in two other sets of five runs, by a nylon vortex finder tube, and by a polyethylene vortex finder tube. The diameter of the upper end of the conical shell 12, which was constructed of Pyrex glass, was 30 mm., and the vortex finder tubes had inside diameters of 6 mm. The discharge nozzle of the conical shell 12, designated by reference numeral 14 in the schematic drawing, had an inside diameter of 3.0 mm., and was also constructed of Pyrex glass.

The mixtures subjected to separation in the system included a liquid hydrocarbon phase of heavy saturated paraffin compounds having a specific gravity of 0.756, solid particles of polyethylene having a specific gravity of 0.92 and an average particle size diameter of 0.294 mm., and a liquid water phase (tap water) having a specific gravity of 1. The liquid hydrocarbon was blended with the polyethylene particles in a tank 16 by the use of a suitable mechanical stirrer 18 to form a mixture containing about 4 weight percent of the particles. This mixture was withdrawn from the tank 16 by a screw conveyor pump 20 which pumped the mixture of hydrocarbon and polyethylene particles to a conduit junction 22 where the solid particles of liquid hydrocarbon were mixed with an equal amount of water and charged tangentially to the upper end of the conical shell 12 of the cyclone. The feed rate of the mixture to the cyclone was maintained within 1.5 percent of 55 cc./second.

The purpose of including the polyethylene particles in the mixture was to overcome the proclivity of the water and hydrocarbon to emulsify at a mixture ratio of 1:1. the polyethylene particles, again exerting the separatory effect due to preferential wetting by the hydrocarbon, tend to prevent the occurrence of such emulsification. If an emulsion should be formed, the function of the hydrocyclone would be merely reduced to the separation of a denser emulsion fraction from a lighter emulsion fraction.

In order to compare the separation efficiency effected when glass, nylon and polyethylene vortex finder tubes are employed, the following equation definitive of the separation efficiency was developed:

$$E = \frac{Q_o[X_o + Z_o] - [X_f + Z_f]}{Q_f[1 - (X_f + Z_f)]} + \frac{Q_u(Y_u - Y_f)}{Q_f(1 - Y_f)} \quad (3)$$

where:
$Q_f$ = Volumetric feed rate, cc./second
$Q_o$ = Volumetric overflow rate, cc./second
$Q_u$ = Volumetric underflow rate, cc./second
$(X_o + Z_o)$ = Volumetric fraction of hydrocarbon and solid phase in the overflow
$(X_f + Z_f)$ = Volumetric fraction of hydrocarbon and solid phase in the feed
$Y_u$ = Volumetric fraction of water in the underflow
$Y_f$ = Volumetric fraction of water in the feed
$Y_o$ = Volumetric fraction of water in the overflow
$(X_u + Z_u)$ = Volumetric fraction of hydrocarbon and solid phase in the underflow It should also be noted that the following relationships exist:

$$Q_f = Q_o + Q_u$$
$$X_o + Z_o + Y_o = 1.0$$
$$X_u + Z_u + Y_u = 1.0$$
$$Q_o(X_o + Z_o) + Q_u(X_u + Z_u) = Q_f(X_f + Z_f)$$
$$Q_o Y_o + Q_o Y_u = Q_f Y_f$$

Graphically depicted in FIGURE 4 are the results of the experimental runs carried out in the laboratory apparatus depicted in FIGURE 2, using in one series of runs, a glass vortex finder tube, in another series of runs a nylon vortex finder tube, and in another series of runs a polyethylene vortex finder tube, while varying the overflow to underflow rates. The ideal efficiency which could theoretically be realized in the cyclone separator at varying ratios of overflow and underflow rates is represented by the dashed line curve. Also plotted on the graph are the efficiency curves obtained when using glass, nylon and polyethylene vortex finder tubes. It will be noted that in the case of the peak actual efficiencies occurring at a slightly greater than 1:1 overflow to underflow rate ratio, the efficiency of separation (as efficiency is defined by Equation 3) is increased from 74 percent to about 85 percent by replacing the glass vortex finder tube with the nylon vortex finder tube. A more striking aspect of the results, however, occurs at the lower ratios of overflow rate to underflow rate from the cyclone where, for example, it will be noted that at a ratio of 0.7, the efficiency is increased by a factor of 1.7 (i.e., from about 0.45 to about 0.71) when the vortex finder is made of either nylon or polyethylene instead of glass. At a $Q_o/Q_u$ ratio of 1, the polyethylene vortex finder tube yields substantially higher separation efficiency than either the glass tube or nylon tube.

From the evident improvement in efficiency which can be realized by judicious selection of the materials of construction of the vortex finder tube and the conical shell of a cyclone separator, an improved cyclone separator design has been developed, and is depicted in FIGURES 4 and 5. This cyclone separator constructed in accordance with the invention is designated generally by reference numeral 40. Geometrically, the cyclone separator is of essentially conventional construction, including a conically shaped metallic housing 42 having a relatively small diameter apex 42a at the lower end thereof, and a cover or top 42b at the relatively large diameter upper end thereof. A discharge conduit 44 is connected to, or formed integrally with, the apex 42a of the housing 42 for receiving the relatively dense liquids or so-called underflow from a mixture of liquids charged to the housing in a manner hereinafter described. The conical portion of the housing, as well as the top 42b, is lined or covered with a glass lining 46. Though it is not illustrated in the depicted embodiment of the invention, the discharge conduit 44 may also be lined for a short distance along its length with a glass liner when the additional cost of this construction is justified by the small degree of enhanced separatory efficiency realized by such construction.

At the upper end of the conical housing 42, and extending tangentially into the housing with respect to the circular cross sectional area thereof, is a feed pipe 48 for the liquid mixture to be separated. Extending through the center or top of the cover 42b and axially into the housing 42 is a vortex finder tube 50. The vortex finder tube 50 may be threaded through the top 42b, or in any other suitable manner made secure in its illustrated position. An end cap 52 is secured to the inner end of the vortex finder tube 50 in any satisfactory manner, such as by threading, friction fit, snap-on, etc. The end cap 52 retains across the end of the vortex finder tube 50, a grid 54 which is constructed in a manner hereinafter described, and is illustrated in greater detail in FIGURE 5.

Describing at this point, the operation of the cyclone separator 10 without reference to the materials of which it is constructed, separating devices of this type operate on the principle of applying centrifugal force to a mixture of liquids so as to cause a relatively denser phase of the mixture to move to a radially outer position with respect to relatively less dense phases of the mixture. Thus, a liquid mixture, or a mixture of liquids containing solids suspended therein, is introduced to the housing 42 by way of the inlet 48. The mixture is introduced at a relatively high velocity, and in a tangential direction with respect to the geometry of the housing so that a swirling action is developed within the housing, and two vortices are formed in the liquid.

The application of centrifugal force to the liquid mixture causes the relatively denser liquids to move radially outwardly into close proximity to the conically shaped wall of the housing. The relatively less dense phases of the mixture remain radially inwardly, or more nearly adjacent the axis of the vortex and housing. The result of this action is that the relatively denser phases of the mixture are moved down the wall of the housing and out through the discharge pipe 44 which is connected to the apex of the conical housing. The relatively less dense or lighter phases of the mixture tend to be "pinched" into the center of the housing and are taken off through the vortex finder tube. A separation based on the density of the liquid is thus effected as a result of the application of centrifugal force to the incoming mixture.

The present invention takes advantage of the different wetting characteristics or intermolecular affinities of various liquids with respect to various types of surfaces in order to enhance the degree of separation obtainable with conventional separatory devices. In the case of the cyclone separator constructed in the manner illustrated in FIGURES 4 and 5, the internal lining 46 of the housing 42 is constructed of glass, and the vortex finder tube 50 is constructed of an organic synthetic resin material which, in the illustrated embodiment, is polyethylene which is selected due to the enhanced efficiency of separation which is obtained when this construction is utilized.

When a mixture of water and n-decane or saturated paraffin hydrocarbons is charged to the cyclone separator 40 of the invention, the water, being the more dense phase of the mixture, will be moved outwardly toward the housing 42 of the separator. The n-decane or saturated paraffin hydrocarbons, being less dense than the water, will remain relatively closer to the axis of the housing 42 than to its glass liner 46, and will thus be located radially inwardly of the outwardly migrating water. As will be concluded from the data appearing in FIGURE 3, the water and hydrocarbon wet the glass about equally well, but the polyethylene of which the vortex finder tube 50 is constructed is wetted much better by the hydrocarbon than by the water. Thus, the hydrocarbon tends to be selectively attracted to the vortex finder tube 50 which, of course, extends axially in the housing 42 and is thus located radially inwardly of the housing at all points. The preferential wetting of the vortex finder tube 50 by the hydrocarbon is further enhanced by roughening the surfaces of this element which are in contact with the mixture located in the cyclone. By reason of the preferential wetting of the vortex finder tube 50 by the hydrocarbon in the liquid mixture, this material tends to move toward and through the vortex finder tube much more easily than the water in the mixture. Thus, an additional force promoting separation of the materials is introduced to the system.

As a final element of the illustrated embodiment of the invention which further assists in effecting the desired separation, the grid 54 is also constructed of polyethylene and the grid acts, in effect, as a gate which selectively passes the hydrocarbon but tends to reject or block passage of the non-wetting material, i.e., water. The grid 54, though shown disposed in the mouth of the vortex finder tube 50, may also be located at other points within the tube, although its effectiveness in aiding separation probably diminishes as it is moved relatively further downstream within the vortex finder tube.

It should be pointed out that the illustrated and described cyclone construction which has been portrayed in FIGURES 4 and 5 may be altered in several respects within the scope of the invention. Other organic plastic materials whose wetting characteristics are illustrated in FIGURE 1 can be employed in the construction of the vortex finder tube 50 and the grid 54, and these characteristics can be altered in the manner previously described by roughening the surfaces of the materials to varying degrees.

The wettability characteristics of materials can also be employed to advantage in other types of separating apparatus in addition to the described cyclone separator apparatus. Thus, the enhanced separatory effect can be utilized, for example, in a gravity settling chamber of the type depicted in FIGURES 6 and 7. The chamber there illustrated is one which was constructed for validating the hypothesis of the invention in the laboratory, and comprises a metal housing designated generally by reference numeral 60 and having metal side walls 62 and 64 and a metal bottom 66. A mixture charging conduit 68 is connected to the lower portion of the side wall 62, and communicates with the interior of the metal housing 60 below a metal plate 70 defining the bottom of a chamber formed by the housing and a polyethylene baffle plate 72 extended transversely across the housing between side walls 74 and 76 as best illustrated in FIGURE 7. A second polyethylene baffle plate 78 also extends transversely across the housing 60 between the side walls 74 and 76, with both the baffle plates 72 and 78 having their lower edges spaced vertically from the bottom 66 of the housing, and their upper edges spaced downwardly from the upper edges of the side walls 74 and 76.

Secured to the side wall 64 of the housing 60 is a horizontally extending metal bottom plate 80, which, with the upper portion of the side wall 64 and a horizontally spaced partial side wall 82, defines a chamber on the opposite side of the housing 60 from the chamber defined between the side wall 62, the plate 70 and the upper portion of the baffle plate 72. It will be noted that the upper edge of the side wall 64 terminates at a location spaced downwardly from the upper edges of the side walls 74 and 76 so that liquid can flow over the upper edge of the side wall 64 and into the chamber defined between this wall and the wall 82.

In a test of the described settling chamber, a feed mixture was charged to the settling chamber which consisted of thoroughly mixed kerosene grade hydrocarbon and water. As the mixture charged to the settling chamber passed beneath the lower edges of the polyethylene baffle plates 72 and 78, it was noted that the hydrocarbon tended to cling to the baffle plates. As a result of this preferential adherence of the hydrocarbon to the baffle plates 72 and 78, the fraction of the charged mixture which moved upwardly in the space defined between these two baffle plates was enriched in the hydrocarbon and was relatively lean in water as compared to the charged mixture. At the upper end of the space between these baffle plates, the hydrocarbon enriched fraction flowed over the top of the baffle plate 72 and into the chamber defined between this baffle plate and the side wall 62 of the housing 60. Thus, the mixture which was accumulated in this space was relatively rich in kerosene as compared to the charged mixture.

The water component of the mixture charged to the settling chamber tended to migrate around the baffle plates 72 and 78 and into the channel defined between the polyethylene baffle plate 78 and the metallic side wall 64. After moving upwardly in this channel, the water rich fraction then moved over the top edge of the metallic side wall 64 and into the chamber defined between this side wall and the partial side wall 82. Thus, there was accumulated in this chamber, a fraction of the charged mixture which was relatively more concentrated in water than was the mixture charged to the settling chamber.

From the foregoing description of the invention, it will have become apparant that the present invention provides a method for significantly enhancing the separation efficiencies which can be obtained with separation devices heretofore in use. Although certain specific embodiments of the invention have been described, it will be appreciated that various changes and innovations in the described structures and operating procedures can be effected without departure from the basic principles which underlie the invention.

What is claimed is:
1. A method for separating from each other a plurality of the liquids in a liquid mixture comprising imparting motion to the mixture to move it into contact with a first material, and at a different location, into contact with a second material, said first and second materials defining a non-linear liquid flow path with said first material being located on the radially inner side of at least one curvilinear portion of said flow path, said first material being wetted substantially better by at least one liquid phase of the mixture than by at least one other liquid phase of the mixture which is denser than said one liquid phase, and said second material being wetted better by said other liquid phase than is said first material; and simultaneously removing a first liquid fraction of the mixture from along said flow path; and removing a second liquid fraction of the mixture from a location adjacent said first material.

2. A method for separating a plurality of liquid phases in a liquid mixture from each other comprising subjecting the mixture to centrifugal force to move at least one relatively denser phase of the mixture to a first location which differs from the location of at least one relatively less dense phase of the mixture; and simultaneously selectively attracting said less dense phase toward the location to which said relatively less dense phase is moved by the applied centrifugal force by placing at said latter location, a first solid material which is wetted better by said relatively less dense phase than by said relatively denser phase.

3. The method defined in claim 2 wherein said mixture is subjected to centrifugal force by directing said mixture tangentially into a conically shaped zone to form at least one vortex in the mixture.

4. The method defined in claim 2 and further characterized to include the step of placing at the location to which said relatively denser phase is moved by application of centrifugal force to said mixture, a second solid material which is wetted better by said relatively denser phase than is said first solid material.

5. The method defined in claim 4 wherein said second solid material is characterized in having a wettability by water such that the contact angle of the water with the second solid material is less than 10°.

6. The method defined in claim 5 wherein said first solid material is an organic synthetic resin.

7. Apparatus for separating a liquid mixture into a plurality of components comprising:

means for imparting centrifugal force to said liquid mixture to move relatively denser components of the mixture radially outwardly with respect to relatively less dense components of the mixture;

a solid member toward and against which the relatively denser components of the mixture are moved by the applied centrifugal force, said solid member having a first surface exposed to contact with the relatively denser components of the mixture, and facing generally in a direction opposite the direction in which said centrifugal force acts; and flow path defining means spaced from said first surface and positioned for receiving and conducting through a path of flow away from said first surface at least one of the relatively less dense components in the mixture after centrifugal force has been initially imparted to the mixture, said flow path defining means including a second surface which is exposed to contact with at least one of the relatively less dense components of the mixture, and which is constructed of a material which is wetted substantially better by said relatively less dense component of the mixture than by the remainder of the liquids in the mixture, said first surface being wetted relatively better by said remainder of the liquids than is said second surface.

8. Apparatus as defined in claim 7 and further characterized to include a grid extending across the flow path defined by said flow path defining means, said grid being constructed of a material which is wetted substantially better by said relatively less dense component of the mixture than by the remainder of the liquids in the mixture.

9. Apparatus as defined in claim 7 wherein said first surface is a material which is wetted at least as well by water as by an organic material.

10. Apparatus as defined in claim 7 wherein said material of which the second surface is constructed is wetted substantially better by an organic material than by water.

11. Apparatus as defined in claim 7 wherein said means for imparting centrifugal force to said liquid mixture comprises:

a cyclone housing of inverted conical configuration; and means for directing said liquid mixture tangentially into the large diameter upper end of said housing.

12. Apparatus as defined in claim 11 wherein said flow path defining means comprises a vortex finder tube extending into said housing from the large diameter upper end thereof, and extending along the axis of said housing to an open end located inside said housing.

13. Apparatus as defined in claim 12 and further characterized to include a grid constructed of the same material as said second surface extending across the open end of said vortex finder tube which is inside said housing.

14. Apparatus as defined in claim 13 wherein said first surface is constructed of glass, and said second surface is constructed of a synthetic organic resin.

15. A method for separating from each other a plurality of the liquids in a liquid mixture comprising imparting motion to the mixture to impart a centrifugal force thereto tending to separate said mixture into fractions having different densities, and simultaneously moving said mixture into contact with a first material defining a liquid flow path, and at a different location, into contact with a second material, said first material being wetted substantially better by at least one liquid phase of the mixture than by at least one other liquid phase of the mixture, and said second material being wetted better by said other liquid phase than is said first material; and simultaneously removing a first liquid fraction of the mixture from along said flow path; and removing a second liquid fraction of the mixture from a location adjacent said second material.

16. In a device including means for subjecting a mixture of liquid phases of differing density to centrifugal force tending to separate said phases from each other, and means for feeding and withdrawing the phases, the improvement which comprises:

first and second solid surfaces located in said device at locations spaced from each other, said first surface being constructed of a material which is wetted better by a relatively less dense liquid phase in said mixture than by the other phases, and said second surface being constructed of a material which is wetted to a lesser extent by said relatively less dense liquid phase than is said first solid surface, said first and second solid surfaces positioned in said device to enhance the separatory effect of centrifugal force.

References Cited

UNITED STATES PATENTS

| | | | |
|---|---|---|---|
| 2,816,659 | 12/1957 | Van Deemter et al. | 210—65 |
| 3,057,476 | 10/1962 | Gilbert | 209—211 |
| 3,237,777 | 3/1966 | Brown et al. | 209—211 X |
| 3,358,838 | 12/1967 | Kosar et al. | 210—179 |

J. L. DECESARE, Primary Examiner

U.S. Cl. X.R.

209—211; 210—512, 521

PO-1050
(5/69)

UNITED STATES PATENT OFFICE
CERTIFICATE OF CORRECTION

Patent No. __3,471,018__   Dated __October 7, 1969__

Inventor(s) __Cedomir M. Sliepcevich and Henry P. Sheng__

It is certified that error appears in the above-identified patent and that said Letters Patent are hereby corrected as shown below:

Column 5, line 7, "has a zero contact angle (complete wet-" should read --is preferentially wetted by the heavier liq- --

Column 7, Equation (3), that portion of the formula reading $$Q_o \left[ X_o + Z_o \right] - \left[ X_f + Z_f \right]$$

should read $Q_o \left[ (X_o + Z_o) - (X_f + Z_f) \right]$

Column 7, line 60, that portion of the formula reading "$Q_o Y_o + Q_o Y_u$" should read --$Q_o Y_o + Q_u Y_u$--.

SIGNED AND
SEALED

JUN 23 1970

(SEAL)
Attest:

Edward M. Fletcher, Jr.
Attesting Officer

WILLIAM E. SCHUYLER, JR.
Commissioner of Patents